US006948234B1

(12) United States Patent
Steiner

(10) Patent No.: US 6,948,234 B1
(45) Date of Patent: Sep. 27, 2005

(54) COMPRESSION TOOL WITH TOGGLE ACTION

(75) Inventor: Richard A. Steiner, East Haddam, CT (US)

(73) Assignee: Rostra Tool Company, Branford, CT (US)

( * ) Notice: Subject to any disclaimer, the term of this patent is extended or adjusted under 35 U.S.C. 154(b) by 381 days.

(21) Appl. No.: 10/032,408

(22) Filed: Dec. 31, 2001

(51) Int. Cl.[7] ................................................ B23P 19/00
(52) U.S. Cl. ............................ 29/751; 29/753; 29/758; 29/748; 29/761; 72/409.14
(58) Field of Search .......................... 29/751, 753, 758, 29/828, 268, 861, 33 M, 750, 761; 72/409.14, 72/409.01, 416; 81/313

(56) References Cited

U.S. PATENT DOCUMENTS 4,790,068 A * 12/1988 Sato ............................ 29/751
5,435,167 A * 7/1995 Holiday et al. ................ 29/751
5,509,291 A * 4/1996 Nilsson et al. ........... 72/409.14
5,870,925 A * 2/1999 Morris et al. ............ 72/409.12
D455,325 S * 4/2002 Steiner ......................... D8/51

* cited by examiner

*Primary Examiner*—Minh Trinh
(74) *Attorney, Agent, or Firm*—John H. Crozier

(57) ABSTRACT

In a preferred embodiment, an end connector compression tool, including: a body; supports to support a cable and uncompressed end connector parts; a compression member axially movable with respect to the body to fixedly attach the end connector parts to the cable by compression of the end connector parts; a handle rotatably attached to the compression member at a first pivot point; and a link rotatably attached to the handle at a second pivot point and to the body at a third pivot point, such that rotation of the handle from an open position to a closed position effects compressive fixed attachment of the end connector parts to the cable. The tool may have an integral coaxial cable stripping function included therein.

12 Claims, 8 Drawing Sheets

COMPRESSION TOOL WITH TOGGLE ACTION

BACKGROUND OF THE INVENTION

1. Field of the Invention

The present invention relates to axial cable connection compression tools generally and, more particularly, but not by way of limitation, to a novel axial cable connection compression tool having a toggle action and, with variations of a basic form, is able to compress a wide range of end connectors.

2. Background Art

Coaxial cables are used in a wide variety of applications. Such cables have end connectors that are typically applied using a compression tool to interfit the component parts of the connectors.

A typical compression tool is limited in mechanical advantage. For example, with one commonly used compression tool, mechanical advantage increases from 4.5:1 at beginning of compression to only 15.25:1 at final compression position. This increases operator fatigue and reduces productivity, since a relatively high degree of manual force is required. Also, the end of the compression cycle is not clearly defined, thus allowing connectors, which require high loads, not to be fully compressed. Most compression tools are not configured for accessory products and thus are limited in the range of connectors that can be accommodated by one compression tool.

Furthermore, know compression tools do not have a conveniently used integral coaxial cable stripper.

Accordingly, it is a principal object of the present invention to provide a coaxial cable end connector compression tool that has a high range of mechanical advantage.

It is a further object of the invention to provide such a tool that can accommodate a wide range of end connectors, with minor modifications thereto.

It is an additional object of the invention to provide such a tool that has a clear tactile indication of the end of a compression cycle.

It is another object of the invention to provide such a tool that can be economically manufactured.

It is yet a further object of the invention to provide such a tool that has a conveniently used integral coaxial cable stripper.

Other objects of the present invention, as well as particular features, elements, and advantages thereof, will be elucidated in, or be apparent from, the following description and the accompanying drawing figure.

SUMMARY OF THE INVENTION

The present invention achieves the above objects, among others, by providing, in a preferred embodiment, an end connector compression tool, comprising; a body; supports to support a cable and uncompressed end connector parts; a compression member axially movable with respect to said body to fixedly attach said end connector parts to said cable by compression of said end connector parts; a handle rotatably attached to said compression member at a first pivot point; and a link rotatably attached to said handle at a second pivot point and to said body at a third pivot point, such that rotation of said handle from an open position to a closed position effects compressive fixed attachment of said end connector parts to said cable. Said tool may have an integral coaxial cable stripping function included therein.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
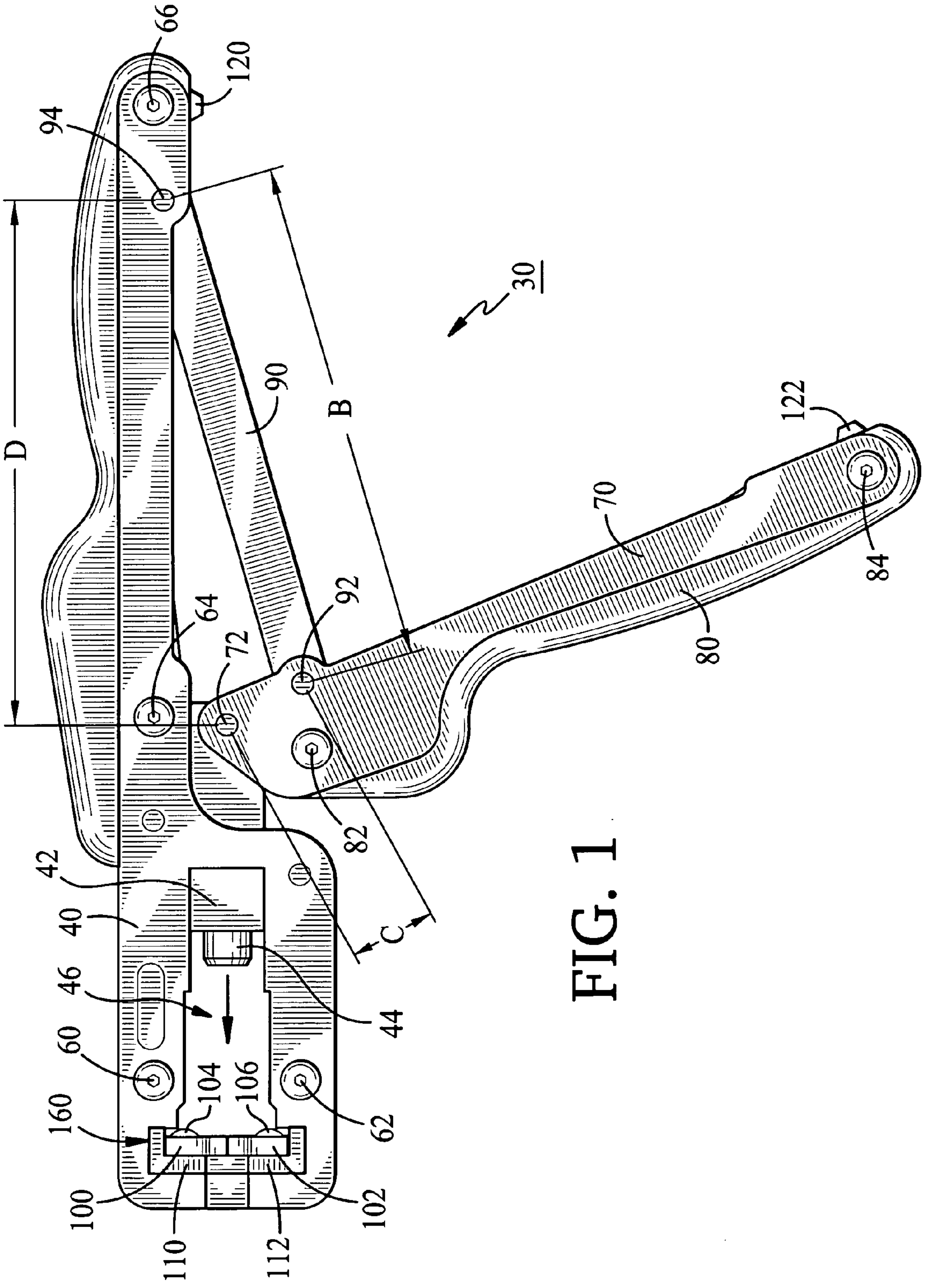
FIG. 1 is a side elevational view of a basic compression tool according to the present invention, the tool being shown in open, non-compressing, position.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

FIG. 1 illustrates a compression tool, constructed according to the present invention, and generally indicated by the reference numeral 30. Compression tool 30 includes a body 40 with a compression tip carriage 42, carrying a compression tip 44, disposed in open channel 46 formed in body 40 for axial motion relative thereto, as shown by the single-headed arrow on FIG. 1.

Figure 3:
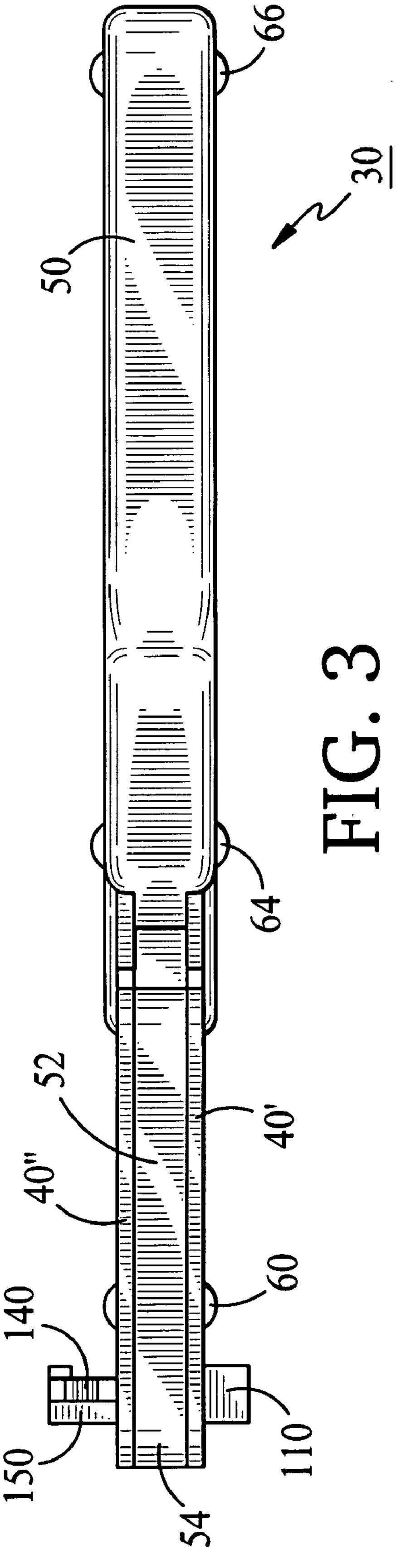
FIG. 3 is a top plan view of the compression tool.
Figure 4:
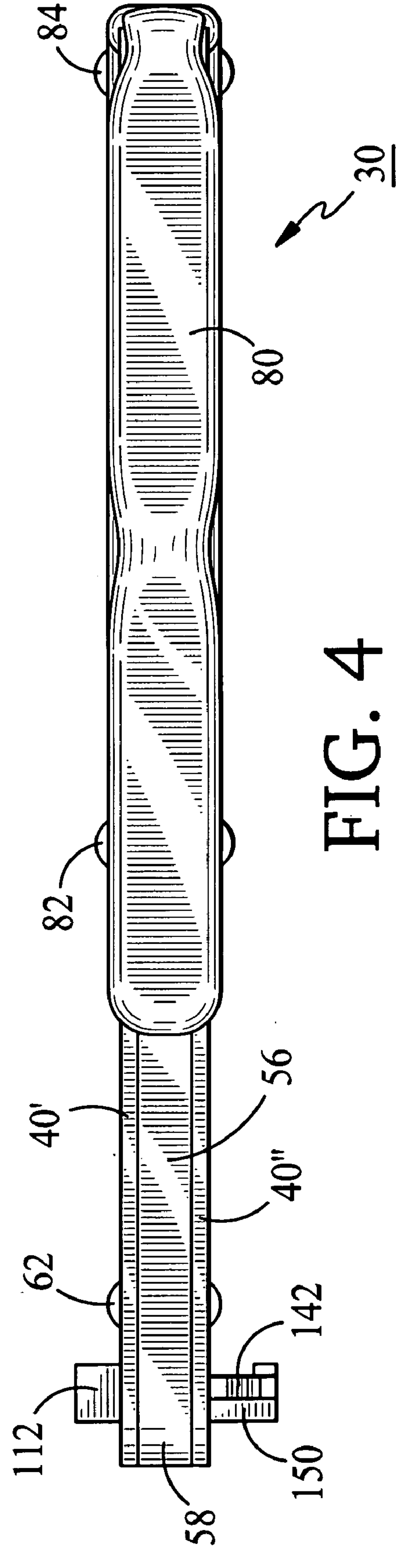
FIG. 4 is a bottom plan view of the compression tool.

As best seen on FIGS. 3 and 4, body 40 is actually two pieces 40' and 40" of stamped sheet metal separated, in part by a portion of plastic member 50 (FIG. 3), in part by upper intermediate member 52 (FIG. 3), in part by upper end member 54 (FIG. 3), in part by lower immediate member 56 (FIG. 4), and in part by lower end member 58 (FIG. 4).

Referring again to FIG. 1, pieces 40' and 40" (FIGS. 3 and 4) are fixedly fastened together by suitable fasteners 60, 62, 64, and 66.

Continuing to refer to FIG. 1, a handle 70 is rotatingly attached to compression tip carriage at a first pivot point 72.

As best seen on FIG. 4, handle 70 is actually two pieces 70'and 70" of stamped sheet metal separated by a portion of a plastic member 80, the two pieces being held fixedly together by suitable fasteners 82 and 84.

Referring again to FIG. 1, an intermediate link 90 formed from stamped sheet metal is rotatingly attached at one end thereof to handle 70 at a second pivot point 92 and at the other end thereof to body 40 at a third pivot point 94. First and second, upper and lower spring loaded jaws 100 and 102 are rotatingly attached, respectively, to upper and lower end members 54 and 58 by means of first and second upper and lower pins 104 and 106. Upper and lower guard extensions 110 and 112, respectively, are provided to protect jaws 100 and 102.

Continuing to refer to FIG. 1, the relative positions of pivot points 72, 92, and 94 are an important aspect of the present invention in providing toggle action and the resulting wide range of mechanical advantage. Here, dimensions A, B, C, and D preferably are spaced the following approximate distances:

A=1.0

B=8.0A

C=1.4A

D=8.4A.

Figure 2:
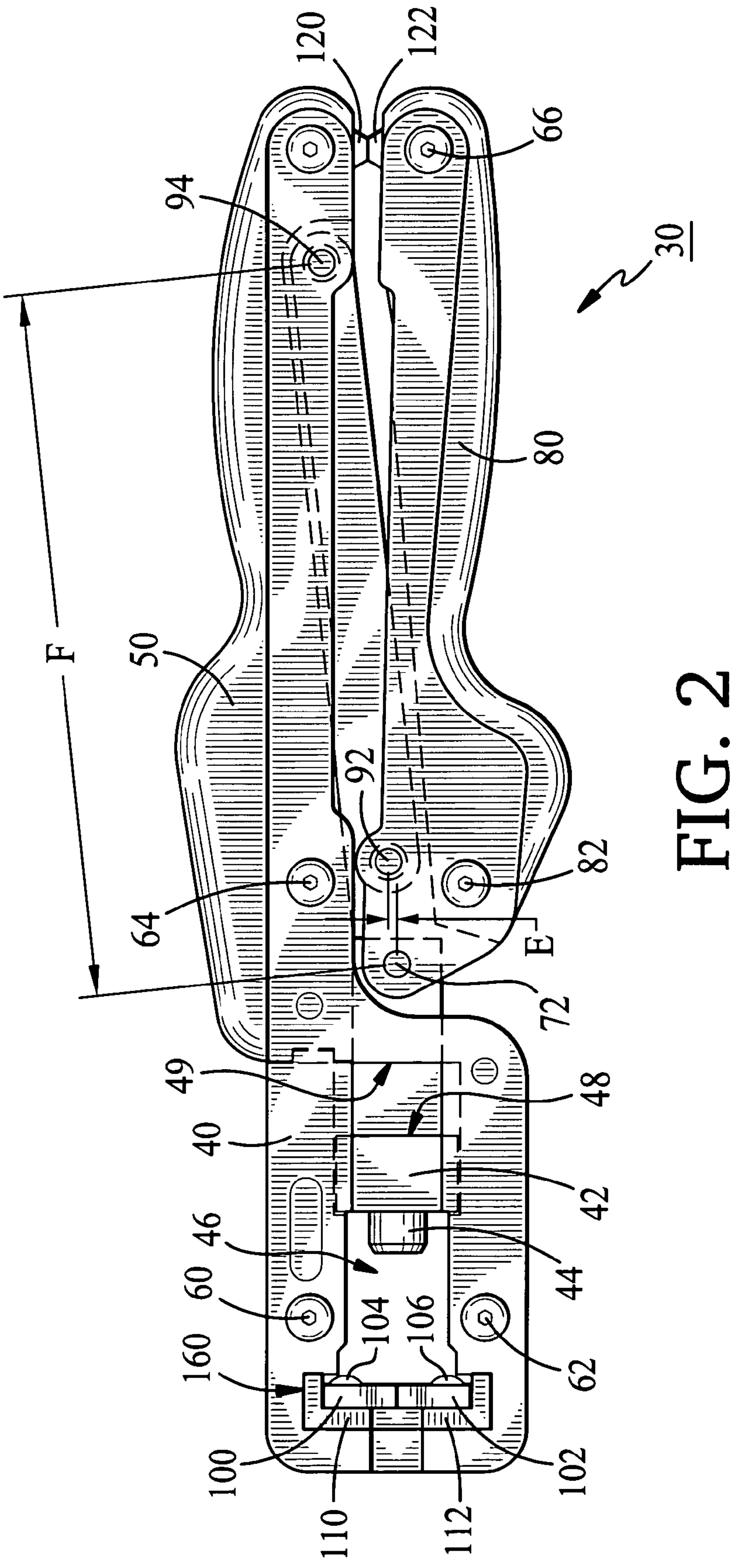
FIG. 2 is a side elevational view of the compression tool, the tool being shown in closed, end-of-compression-cycle, position.

Referring now to FIG. 2, compression tool 30 is shown in its fully closed position wherein dimension E=0.2A and dimension F=9.5A. FIG. 2 also illustrates that tactile feedback is given when the end of a compression cycle is reached by the engagement of upper and lower stops 120 and 122, respectively, formed as extensions of upper and lower plastic members 50 and 80. A shoulder 48 formed on compression pin carriage 42 engages the end 49 of chamber 46 (FIG. 1) to limit the degree of opening of compression tool 30.

Figure 5:
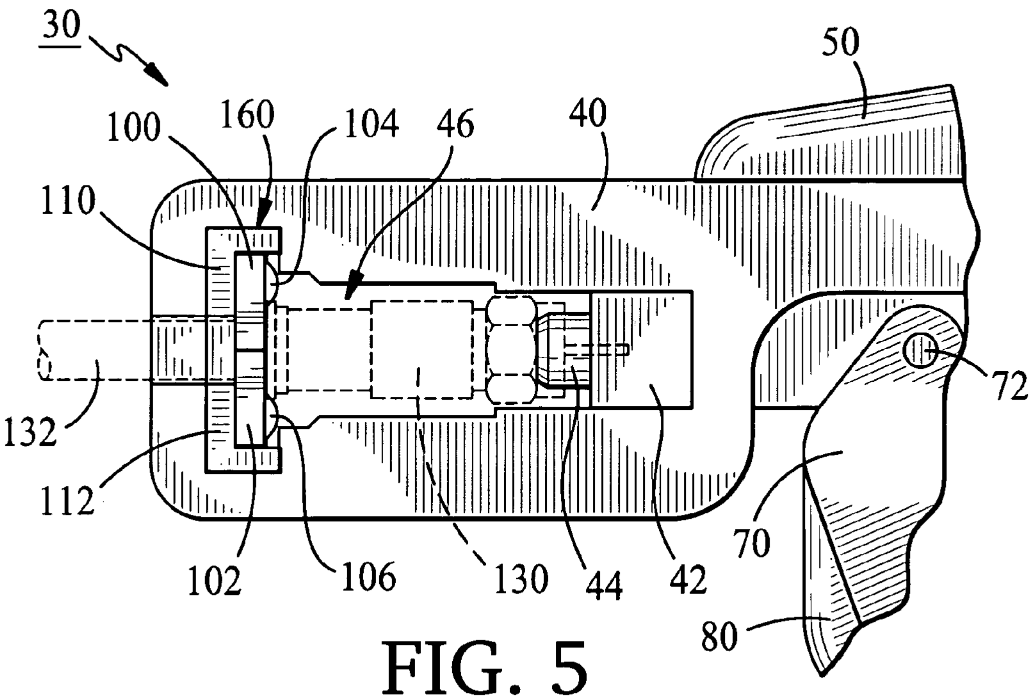
FIG. 5 is a fragmentary, side elevational view of the compression tool in open position, with uncompressed end connection parts the end of a cable inserted therein.
Figure 6:
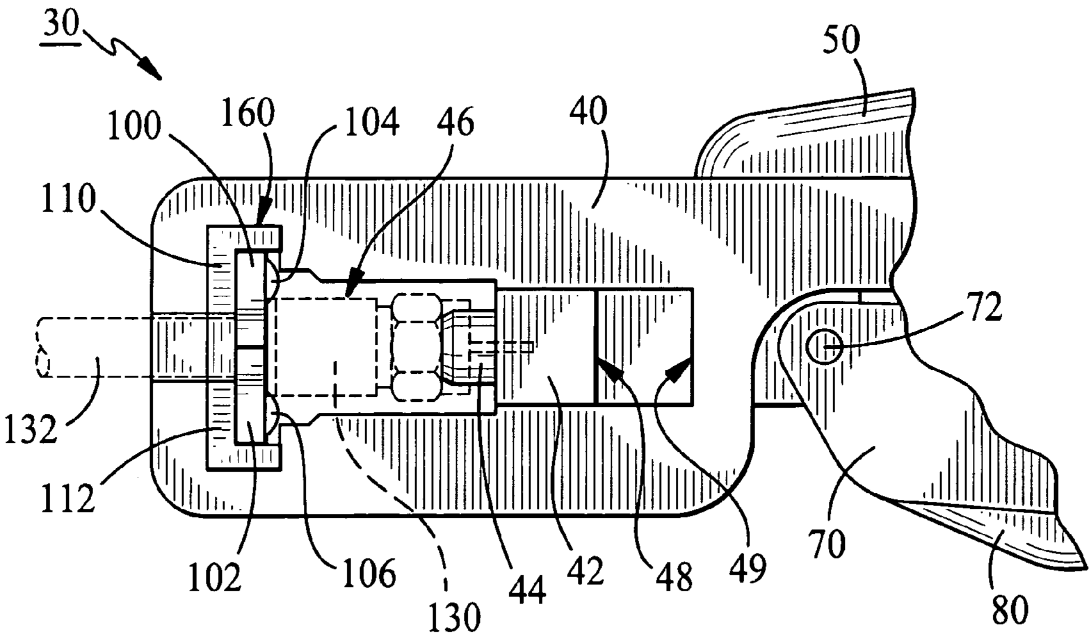
FIG. 6 is a fragmentary, side elevational view of the compression tool in fully closed position, with the end connection parts and the cable assembled.

FIGS. 5 and 6 illustrate the operation of compression tool 30. Referring first to FIG. 5, uncompressed end connector parts 130 and an end of a coaxial cable 132 (shown in broken lines) are placed in chamber 46 and supported therein by spring loaded fingers 100 and 102 and compression pin 44. Handle 70 is then rotated from the position shown on FIG. 5 (also FIG. 1) to the position shown on FIG. 6 (also FIG. 2). This action compresses parts 130 and fixes them to the end of coaxial cable 132 and the finished product is then removed from tool 30.

Figure 7:
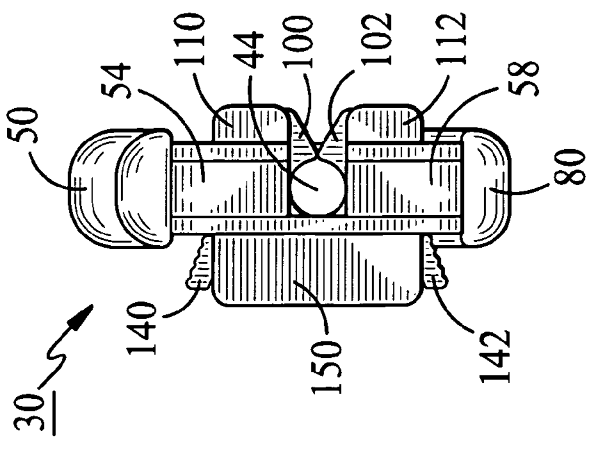
FIG. 7 is an end elevational view of the compression tool.

Referring now to FIG. 7, to assist in loading unassembled parts 130 and end of coaxial cable 132 (FIG. 5) into chamber 46, finger pads 140 and 142 provided as extensions of spring loaded fingers 100 and 102 may be squeezed together to open the spring loaded fingers. A guard member 150 protects finger pads 140 and 142.

Elements 100, 102, 104, 106, 110, and 112 (all best seen on FIG. 1), and 140, 142, and 150 (all best seen on FIG. 7) are formed in a single unit fixedly inserted into a transverse slot 160 defined in body 40.

With the above dimensions, the mechanical advantage of compression tool 30 increases from 4:1 in the open (uncrimped) position (FIG. 1) to 200:1 in a nearly closed (fully crimped) position (FIG. 2), a substantial increase over conventional compression tools. This minimizes user fatigue and promotes high levels of productivity.

Figure 8:
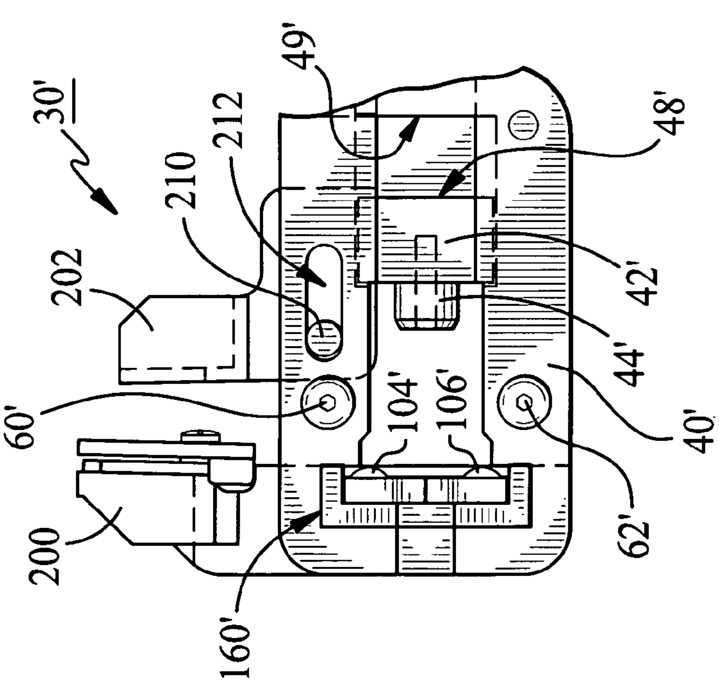
FIG. 8 is a fragmentary, side elevational view of an embodiment of the compression tool employing auxiliary compression jaws.

FIG. 8 illustrates basic tool 30 (FIG. 1) with the addition of fixed and movable auxiliary jaws 200 and 202, respectively, the tool being indicated generally by the reference numeral 30'. Elements similar or identical to those of tool 30 are given primed reference numerals. Fixed auxiliary jaw 200 replaces upper end member 54 (FIG. 7) and is an extension of body 40'. Movable auxiliary jaw 202 is an extension of compression pin carriage 42 (FIG. 1) and replaces upper intermediate member 52. Movable auxiliary jaw 202 is guided in part by a pin 210 movable axially in a slot 212 defined in body 40'. It will be understood that tool 30' may be used for attaching two different end connectors to cable (neither shown).

Figure 9:
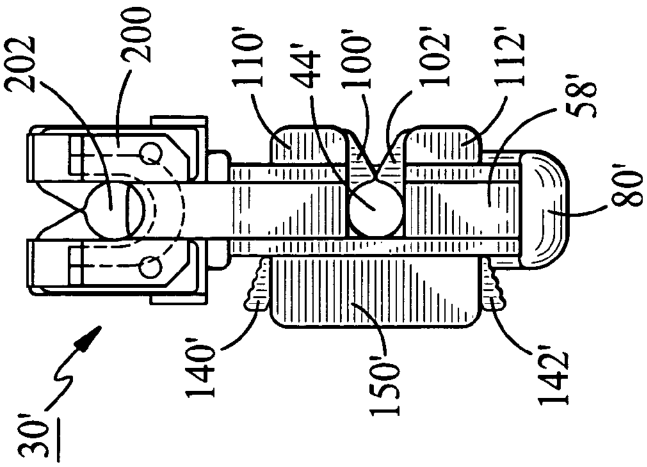
FIG. 9 is an end elevational view of the embodiment of FIG. 8.

FIG. 9 further illustrates the components of tool 30'.

Figure 10:
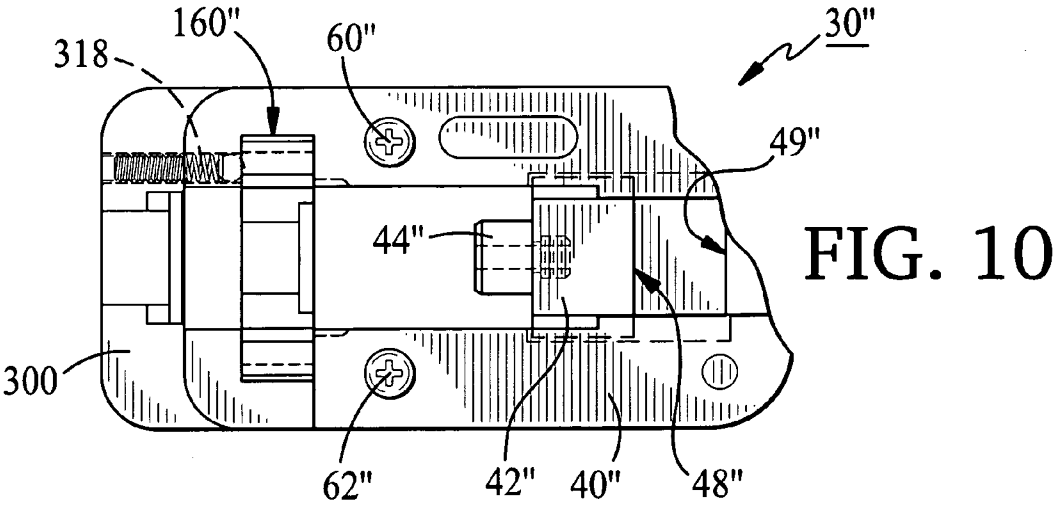
FIG. 10 is a side elevational view of another embodiment of the compression tool.
Figure 11:
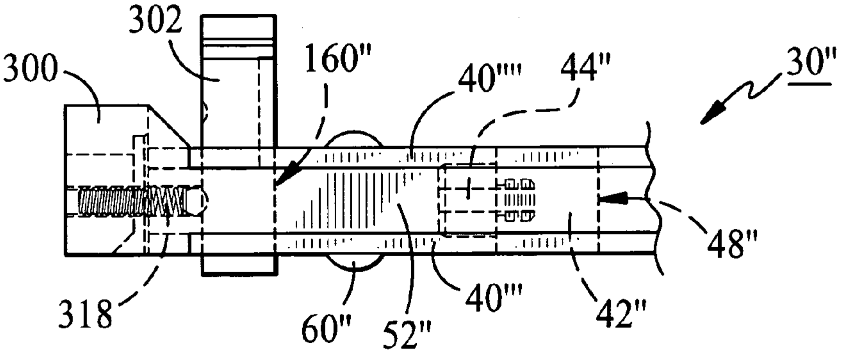
FIGS. 11 and 12 are top plan and end elevational views, respectively, showing the tool of FIG. 10 configured to attach end connectors to one range of sizes of coaxial cable.

FIG. 10 illustrates basic tool 30 (FIG. 1) with an end extension 300 and a sliding plate 302, respectively, the tool being indicated generally by the reference numeral 30". Elements similar or identical to those of tool 30 are given double primed reference numerals. End extension 300 replaces upper and lower end members 54 and 58 (FIG. 7) of tool 30 and is fixedly clamped between pieces 40'" and 40"" of body 40" (FIG. 11). Sliding plate 302 replaces the elements in slot 160 (FIGS. 1 and 7) and is movably held in slot 160" by means of a ball detent lock mechanism 318 extending through end extension 300 and grippingly bearing against the sliding plate.

FIG. 11 illustrates tool 30" configured to attach end connectors to a first range of cable sizes, with sliding plate 302 moved to an inactive position and held there by means of ball detent lock 318 such that a cable (not shown) is supported by end extension 300.

Figure 12:
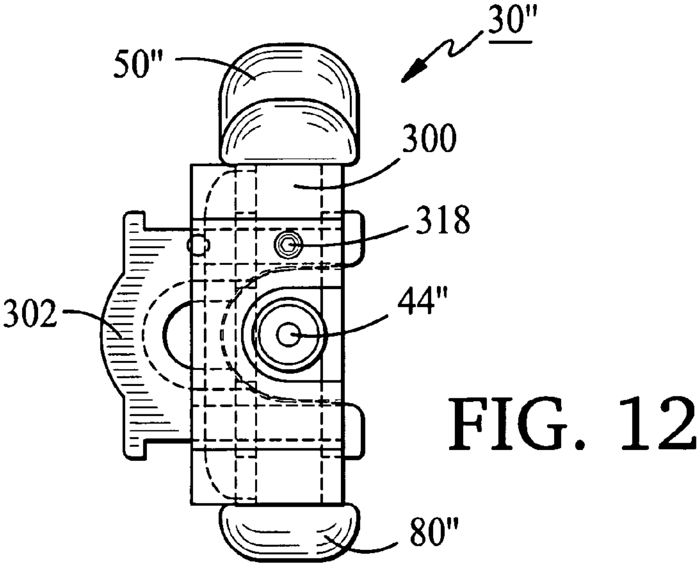

FIG. 12 further illustrates the arrangement of FIG. 11.

Figure 13:
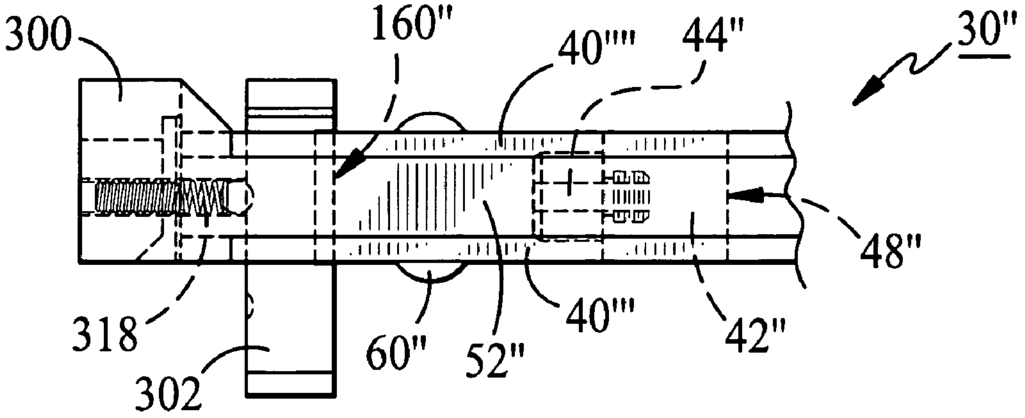
FIGS. 13 and 14 are top plan and end elevational views, respectively, showing the tool of FIG. 10 configured to attach end connectors to another range of sizes of coaxial cable.
Figure 14:
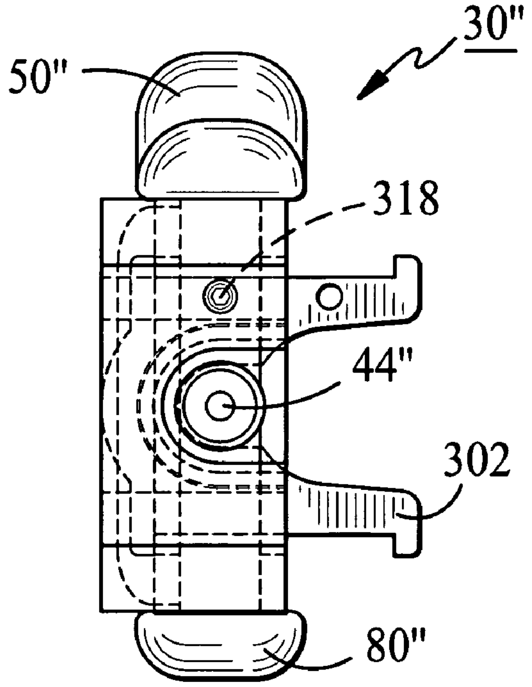

FIGS. 13 and 14 illustrate sliding plate 302 moved to an active position and held there by means of ball detent lock 318 such that a cable (not shown) is supported by the sliding plate.

Figure 15:
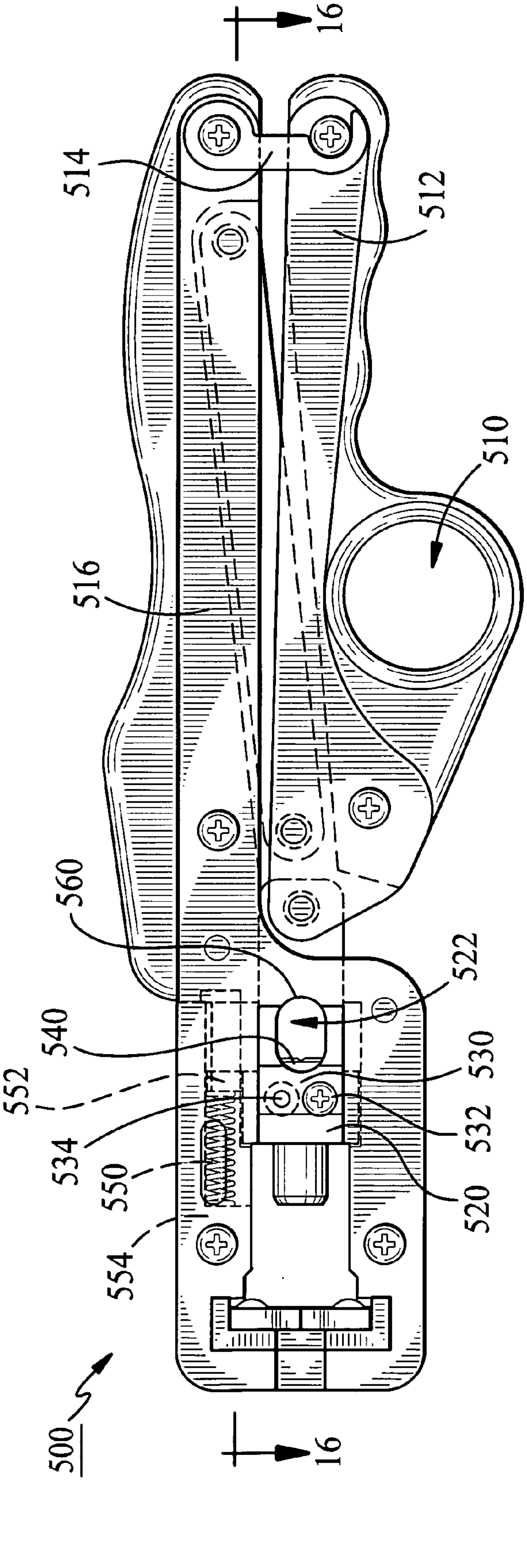
FIG. 15 is a side elevational view of a further embodiment of the present invention, this one incorporating a stripping function.

FIG. 15 illustrates a further embodiment of the present invention, indicated generally by the reference numeral 500, the tool incorporating a stripping function. Since the stripping function may be used with any of the foregoing embodiments, only the features pertinent to the stripping function are given reference numerals and described.

Tool 500 includes a finger opening 510 disposed intermediate the ends of a handle 512, the handle having a handle lock 514 disposed between the distal ends of the handle and one side of a body 516. A compression pin carriage 520 has an opening 522 defined therethrough for the insertion therein of a coaxial cable (not shown). Compression pin carriage 520 has mounted on the near side thereof an insulation cutting blade 530 fixedly attached to the compression pin carriage by means of a threaded screw 532 and a locating pin 534. On the far side of compression pin carriage 520 there is mounted thereto a notched cutting blade 540 fixedly attached to the compression pin carriage by means of a threaded screw 542 and a locating pin (not shown) similar to locating pin 534. A return spring 550 is disposed between an upwardly extending flange 552 on compression pin carriage 520 and an upper intermediate member 554, the compression spring biasing the compression pin carriage to the right on FIG. 15, thus causing handle 512 to move from the closed position shown on FIG. 15 to an open position (similar to that shown on FIG. 1) when handle lock 514 is released.

Figure 16:
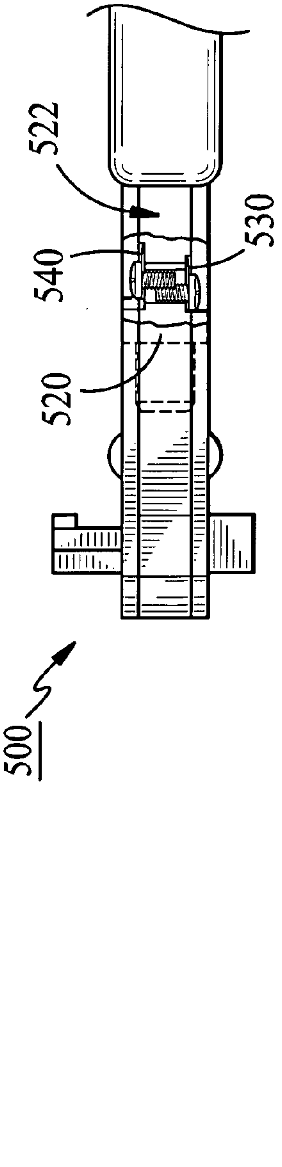
FIG. 16 is a fragmentary, top plan view, taken along line "16—16" of FIG. 15.

FIG. 16 illustrates more clearly the mounting of cutting blades 530 and 540.

In the stripping operation, a coaxial cable (not shown) is inserted into opening 522. Then, handle lock 514 is rotatingly released, thus permitting compression pin carriage 530 to move rearwardly on FIG. 15, forcing the coaxial cable against arcuate indentations formed on the two halves of body 516 and moving handle 512 to its open position. Insertion of a finger (not shown) in finger hole 510 and rotation of tool 500 about the coaxial cable causes cutting blade 530 to cut through the outer insulation layer on the coaxial cable, exposing the braided shield of the cable, and notched cutting blade 540 to cut to the center conductor on the cable. The cut material is then removed by pulling the coaxial cable from tool 500. Tool 500 can then be used in the manner described above to crimp end connectors to the cable.

From the above description, it is apparent that minimal variations to a basic tool permit a wide range of connectors to be compressed by the tool or coaxial cable stripped by the tool. These connectors include those furnished by Thomas & Betts (Snap-N-Seal), Gilbert (Ultra Seal), PPC (EXXL), and Antec (Digicon).

Having the handle behind the compression chamber offers the advantage of having easy access on MDU (multiple dwelling unit) enclosures and wall plate stub-ins.

Terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An end connector compression tool, comprising:

(a) a body;

(b) supports disposed in said body for support therein of a cable axially disposed with respect to said body and uncompressed end connector parts;

(c) a compression member axially movable with respect to said body to fixedly attach said end connector parts to said cable by compression of said end connector parts;

(d) a handle rotatably attached to said compression member at a first pivot point; and (e) a link rotatably attached to said handle at a second pivot point and to said body at a third pivot point, such that rotation of said handle from an open position to a closed position effects compressive fixed attachment of said end connector parts to said cable.

2. The end connector compression tool, as defined in claim 1, wherein, when a major axis of said end connector compression tool is horizontal:

(a) said third pivot point is a distance "A" above said first pivot point;

(b) said second pivot point and said third pivot point are spaced apart approximately a distance 8.0"A";

(c) said first pivot point and said second pivot point are spaced apart approximately a distance 1.4"A";

(d) said first pivot point and said third pivot point are spaced apart approximately a distance 8.4"A" when said end connector compression tool is in said fully open position;

(e) said second pivot point is spaced approximately a distance 0.2"A" above said first pivot point when said end connector compression tool is in a fully closed position; and (f) said first pivot point and said third pivot point are spaced apart approximately a distance 9.5"A" when said end connector compression tool is in said fully closed position.

3. The end connector compression tool, as defined in claim 1, wherein: stops extending inwardly formed at distal ends of said body and said handle coengage when said end connector compression tool is in its fully closed position, to provide tactile feedback that said end connector parts are compressively attached to said cable.

4. The end connector compression tool, as defined in claim 1, wherein: said supports comprise a pair of spring loaded fingers axially spaced apart form an end of said compression member and disposed at a proximal end of said body.

5. The end connector compression tool, as defined in claim 1, wherein: one of said supports is fixedly disposed in a transverse slot defined in said body.

6. The end connector compression tool, as defined in claim 5, wherein: said one of said supports comprises a pair of spring loaded fingers.

7. The end connector compression tool, as defined in claim 5, wherein:

(a) said one of said supports is a sliding plate selectively moveable in said transverse slot between active and inactive positions;

(b) when said sliding plate is in said active position, said sliding plate serves as a first support;

(c) an end of said compression member serves as a second support.

8. The end connector compression tool, as defined in claim 7, wherein: when said sliding plate is moved to said inactive position, an end extension attached to an end of said end connector compression tool serves as said first support.

9. The end connector compression tool, as defined in claim 1, wherein said supports include:

(a) first and second support members and first and second auxiliary compression jaws;

(b) said first support member comprising a pair of spring loaded fingers;

(c) said second support member comprising an end of said compression member;

(d) said first auxiliary compression jaw being fixed and an extension of said body;

(e) said second auxiliary compression jaw being moveable and an extension of said compression member;

wherein: one of said first and second support members and said first and second auxiliary compression jaws can be selected to support said cable and said uncompressed end connector parts and used to fixedly compressively attach said end connector parts to said cable.

10. The end connector tool, as defined in claim 1, wherein: said end connector tool has a mechanical advantage of on the order of about 4:1 when in said open position and on the order of about 200:1 when near said closed position.

11. The end connector tool, as defined in claim 1, further comprising:

(a) a opening defined through said compression member sized to accept therein a coaxial cable;

(b) two cutting blades disposed one on either side of said compression member so as to cut partially through layers of a coaxial cable inserted in said opening;

(c) a return spring disposed so as to bias said compression member toward said coaxial cable and said cutting blades toward and into said coaxial cable, biasing of said compression member effecting movement of said handle from a closed position to an open position; and (d) an opening defined through said tool to permit rotation of said tool about said coaxial cable to thus cut partially through said layers of said coaxial cable.

12. The end connector compression tool, as defined in claim 11, further comprising: a handle lock to prevent said movement when said handle is in said closed position.

* * * * *